US009560304B2

(12) United States Patent
Seidel et al.

(10) Patent No.: US 9,560,304 B2
(45) Date of Patent: Jan. 31, 2017

(54) MULTI-CHANNEL AUDIO ENHANCEMENT FOR TELEVISION

(75) Inventors: Craig Howard Seidel, Palo Alto, CA (US); Coleman Dale Sisson, Jr., Half Moon Bay, CA (US)

(73) Assignee: TVWORKS, LLC, Philadelphia, PA (US)

( * ) Notice: Subject to any disclaimer, the term of this patent is extended or adjusted under 35 U.S.C. 154(b) by 0 days.

(21) Appl. No.: 13/242,298

(22) Filed: Sep. 23, 2011

(65) Prior Publication Data

US 2012/0110611 A1    May 3, 2012

Related U.S. Application Data

(63) Continuation of application No. 10/103,486, filed on Mar. 20, 2002, now Pat. No. 8,046,792.

(51) Int. Cl.
| | |
|---|---|
| *H04N 7/16* | (2011.01) |
| *H04N 5/44* | (2011.01) |
| *H04N 5/60* | (2006.01) |
| *H04N 21/2187* | (2011.01) |
| *H04N 21/439* | (2011.01) |
| *H04N 21/45* | (2011.01) |
| *H04N 21/482* | (2011.01) |
| *H04N 21/81* | (2011.01) |
| *H04N 21/84* | (2011.01) |

(52) U.S. Cl.
CPC ............ *H04N 5/4401* (2013.01); *H04N 5/602* (2013.01); *H04N 21/2187* (2013.01); *H04N 21/439* (2013.01); *H04N 21/4532* (2013.01); *H04N 21/4826* (2013.01); *H04N 21/8106* (2013.01); *H04N 21/84* (2013.01)

(58) Field of Classification Search
CPC ....................................................... H04N 7/163
USPC .......... 725/28–31, 37–61, 87–118, 136–139; 709/217–232; 348/461, 462, 468, 569
See application file for complete search history.

(56) References Cited

U.S. PATENT DOCUMENTS

| | | | | |
|---|---|---|---|---|
| 3,873,777 A | * | 3/1975 | Uehara ................. | H04J 3/1605 348/388.1 |
| 3,991,265 A | * | 11/1976 | Fukuda .............. | H04N 1/00098 348/485 |
| 5,315,445 A | * | 5/1994 | Fukumoto et al. | G11B 20/1208 360/27 |
| 5,359,712 A | * | 10/1994 | Cohen .................. | G11B 27/034 348/E5.051 |
| 5,519,780 A | | 5/1996 | Woo et al. | |
| 5,532,762 A | * | 7/1996 | Sakai ..................... | H04N 5/605 348/731 |
| 5,600,364 A | | 2/1997 | Hendricks et al. | |

(Continued)

*Primary Examiner* — Annan Shang
(74) *Attorney, Agent, or Firm* — Banner & Witcoff, Ltd.

(57) ABSTRACT

A comprehensive mechanism is provided for broadcasting and accessing multiple audio sources in connection with the viewing of a television program. Audio is collected through the use of standard audio capture techniques. Next, the audio is distributed by either of in-band via broadcast or out-of-band techniques. In-band audio is preferably provided via an MPEG stream associated with the current television program. Out-of-band (OOB) audio can be broadcast as well, although it is preferable to select which channel is distributed upstream first, rather than broadcast all channels downstream and consume bandwidth for unselected audio. The viewer operates a set top box to select the appropriate audio channel(s) for reproduction.

20 Claims, 6 Drawing Sheets

(56) References Cited

U.S. PATENT DOCUMENTS

| | | |
|---|---|---|
| 5,808,694 A | 9/1998 | Usui et al. |
| 5,959,684 A * | 9/1999 | Tan .................. H04N 21/4341 348/500 |
| 6,064,438 A | 5/2000 | Miller |
| 6,185,527 B1 * | 2/2001 | Petkovic ........... G06F 17/30746 704/231 |
| 6,212,201 B1 * | 4/2001 | Hinderks et al. ............. 370/468 |
| 6,233,253 B1 | 5/2001 | Settle et al. |
| 6,344,939 B2 | 2/2002 | Oguro |
| 6,694,027 B1 * | 2/2004 | Schneider ............... H04S 3/008 381/20 |
| 6,754,241 B1 | 6/2004 | Krishnamurthy et al. |
| 6,972,802 B2 | 12/2005 | Bray |
| 7,017,120 B2 * | 3/2006 | Shnier ............... G06F 17/30017 700/94 |
| 7,020,888 B2 | 3/2006 | Reynolds et al. |
| 7,020,894 B1 | 3/2006 | Godwin et al. |
| 7,051,360 B1 | 5/2006 | Ellis et al. |
| 7,092,821 B2 | 8/2006 | Mizrahi et al. |
| 7,123,709 B1 * | 10/2006 | Montgomery ...... H04M 3/4285 379/201.01 |
| 7,162,532 B2 * | 1/2007 | Koehler et al. ............... 709/231 |
| 7,448,063 B2 | 11/2008 | Freeman et al. |
| 7,676,583 B2 | 3/2010 | Eaton et al. |
| 8,020,183 B2 * | 9/2011 | Ferman et al. ................. 725/46 |
| 8,220,021 B1 * | 7/2012 | Look et al. ..................... 725/45 |
| 8,291,457 B2 * | 10/2012 | Laksono ........................ 725/78 |
| 8,640,161 B2 * | 1/2014 | Rashkovskiy et al. ......... 725/32 |
| 2002/0087999 A1 | 7/2002 | Kashima |
| 2002/0099458 A1 * | 7/2002 | Rudolph ................ H04H 60/04 700/94 |
| 2002/0122137 A1 | 9/2002 | Chen et al. |
| 2002/0128822 A1 * | 9/2002 | Kahn ..................... G10L 21/01 704/200.1 |
| 2002/0138852 A1 * | 9/2002 | Reynolds ............ H04N 21/235 725/136 |
| 2002/0188943 A1 | 12/2002 | Freeman et al. |
| 2003/0041110 A1 * | 2/2003 | Wenocur ............ G06Q 10/107 709/206 |
| 2003/0084442 A1 * | 5/2003 | Kellner et al. .................. 725/38 |
| 2003/0091329 A1 * | 5/2003 | Nakata et al. ....... G11B 27/034 386/281 |
| 2003/0118243 A1 * | 6/2003 | Sezer et al. ............. G06T 9/005 382/245 |
| 2003/0154473 A1 * | 8/2003 | Shin .................. H04N 5/44543 725/28 |
| 2003/0167167 A1 | 9/2003 | Gong |
| 2004/0199502 A1 | 10/2004 | Wong et al. |
| 2005/0105486 A1 | 5/2005 | Robinett et al. |
| 2006/0239647 A1 * | 10/2006 | Mori et al. ........... G11B 27/105 386/248 |

\* cited by examiner

MULTI-CHANNEL AUDIO ENHANCEMENT FOR TELEVISION

CROSS-REFERENCE TO RELATED APPLICATIONS

This application is a continuation of U.S. patent application Ser. No. 10/103,486, titled "Multi-Channel Audio Enhancement for Television" and filed Mar. 20, 2002, the entire disclosure of which is hereby incorporated by reference.

BACKGROUND OF THE INVENTION

Technical Field

The invention relates to television. More particularly, the invention relates to a multi-channel audio enhancement for television.

Description of the Prior Art

Television is currently limited to one channel of audio, with the ability to select an alternate audio program, usually in a different language. During some programs, especially sporting events, there are situations where the viewer would like to monitor other audio sources. For example, the televising of sporting events offers the opportunity to allow viewers to get in close to the action. Much in the way that multi-angle viewing allows viewers to see particular aspects of the event, the ability to provide multi-source audio would allow viewers to listen to particularly interesting parts of the program.

For example, the following sporting and other events could be provided to viewers with selectable television audio: NASCAR®. NASCAR fans have taken up the practice of bringing scanners to races so they can listen to the communications between drivers and the pits. This is extremely popular and could be extended to the home experience. That is, viewers could listen to the radio channel of their choice through their television.

Football. There is lots of talking (and grunting) on the field. There are also communications from the coaches, e.g. to players and to the booth. Broadcasters often have mikes on players/coaches and also use parabolic mikes to capture on-field sounds.

Baseball. There is lots of discussion in the dugout. During some games in 2001, certain players or coaches were "miked" and held discussions with announcers in the booth.

Soccer. As with football, coaches can be "miked" and the field can be monitored.

Golf. A selectable audio feature would allow viewers to listen to discussions between the golfer and the caddy.

Music/Concerts. It may be desirable to hear a particular part of the orchestra or band, separate from the fully mixed music, or to listen to the stage directions given to the support crew.

News Event. It may be desirable to listen to a commentator rather than the speaker, or vice versa.

Track and Field/Olympics. A selectable audio feature would allow viewers to listen to coaches and players.

All Sports. A selectable audio feature would allow viewers to choose which announcer to listen to, e.g. in team sports, typically, each team has an announcer; or to hear the ambient sounds associated with the sport, thereby heightening the realism of the event for the viewer.

As discussed above, broadcast television presently allows a viewer to select between a limited number of audio channels. Thus, MTS audio provides an analog means to provide multiple audio tracks, including stereo and a second audio program (SAP); and various digital techniques, such as those defined with MPEG, allow additional audio streams to be associated with a given video stream. Traditional methods involve selecting one of these audio channels during setup.

The British Broadcasting Corporation (BBC) in the UK has demonstrated the use of more than one audio channel. In this demonstration, the BBC recorded additional audio, specifically an alternate announcer channel and a "crowd noise" channel. This information was delivered with the video in an MPEG stream. An application was created specifically for this use where the user could press buttons on the remote that were mapped to the audio. When the button was pressed, the audio channel is switched.

In the BBC demonstration, the entire process is hard coded. That is, there is no descriptive data that accompanies the audio to allow it to be processed at the receiver. The receiver must have a priori knowledge of exactly how the audio is sent and what the audio is. For example, the receiver has no means to determine which channel is crowd noise and which one is the announcer. This approach cannot be scaled to an arbitrary number of channels because it depends on buttons. It cannot provide any information to the user about the channel, either for informational purposes or to aid in selection. Furthermore, a general application that handles audio under different circumstances cannot be built. Preference engines cannot be implemented to assist the user in selecting suitable or interesting audio channels.

To make a networking analogy, the BBC demonstration represents the low-level point-to-point protocols, such as PPP, that deliver data across a single link. It would be advantageous to address the other layers of communication protocol that allow data to be delivered across multiple nodes reliably and to be processed in some useful context at the end.

It would be advantageous to provide a comprehensive mechanism for broadcasting and accessing multiple audio sources in connection with the viewing of a television or other program.

SUMMARY OF THE INVENTION

The invention provides a comprehensive mechanism for broadcasting and accessing multiple audio sources in connection with the viewing of a television or other program. One advantage of the invention described herein is the end-to-end nature and flexibility and generality of the solution. The invention provides an approach that offers unlimited numbers of channels. Data can be added to these channels to increase the interest value and utility of the audio. Once this is done, the combined audio and data can be used to provide high value services to a viewer.

In the preferred embodiment, the first step in providing audio is collecting the audio. This is done through the use of standard audio capture. Next, the audio must be distributed. This is preferably done either in-band via broadcast or out-of-band through some other transport channel. In-band audio is preferably provided via an MPEG stream associated with the current television program. However, delivery of the audio via other broadcast mechanisms has the same effect. Within a broadcast cable, satellite or terrestrial system, all audio related to a given video program are generally included in the same RF channel. Out-of-band (OOB) audio can be transmitted as well, although it is preferable to select which channel is distributed upstream. That is, only the desired audio channel(s) are sent over the OOB channel, e.g. after viewer selection from a plurality of choices. With either system, the set top box is used by the viewer to select the appropriate audio channel(s) and to route the television audio to a television or to a separate amplifier and speakers for reproduction.

The audio is preferably tagged with metadata, such that information describing the audio accompanies each audio channel. There are various ways of delivering tag data and associating it with the audio, such as delivering the data along with other information that identifies the program, delivering separate data in conjunction with the audio, or embedding the data with the audio as part of the audio encoding, Such tagging allows, for example, a description of the audio to be provided to the viewer as part of a selection mechanism (see below), and/or provides control information that is used by the system, for example to configure the system for a particular type of audio processing, e.g. DTS; display accompanying graphic information; such as an ad; or engage a viewer authentication/billing mechanism, for example to provide upstream information concerning the viewer's selections. In addition, the metadata can be used to display a visual identification such as a text or graphics overlay to indicate to the viewer which selectable audio track is presently selected. The visual identification could be displayed continuously or alternatively, could be displayed in response to a user request initiated for example by a button on the remote control.

The presently preferred embodiment of the invention provides two mechanisms for selecting audio, i.e. manual selection and assisted selection. With manual selection, the viewer is presented with various options and determines which audio channel to use. For example, a graphics overlay can be presented on the television screen which displays the available audio channels to the viewer. When a viewer presses a selection key or moves a selection means, such as a cursor, to a particular item, the desired audio channel is selected. Assisted selection adds intelligence to the selection process. In this mode, information on the viewer's preference is either gathered directly from the viewer or via a separate mechanism, e.g. such preferences may be inferred from the viewer's viewing preferences or from a viewer profile. This information is used to prioritize or to cull the list of what is offered, thereby only presenting the viewer with choices that are of interest to the viewer. For example, if the viewer is the fan of a particular racer, that racer could always be offered first. Note that previous selections made by the viewer could be used as part of the information used to customize the list for the viewer.

The process of selecting audio can also include the application of parental controls. For example, audio can be tagged with ratings information, and parents can be provided the means, as is done with traditional parental controls, to limit listening to approved selections.

Additional audio programs can include closed captions. These captions can be displayed on the television either with the audio or in lieu of it. Note that this improves the monitoring of multiple audio programs. For example, a viewer may listen to one audio channel while he monitors a closed caption version of another audio channel.

Additional audio selections may be offered as a premium that can be billed through a variety of models, e.g. unlimited free, per use, and total time. The billing system for such premium selections is preferably incorporated in a billing method that is similar to that of video-on-demand (VOD). The basic elements of such billing system include ordering, provisioning, i.e. turning on the audio, and billing. Note that for audio to be billed, it should include conditional access. This can take advantage of existing conditional access systems, or it can be handled via web rights management methods, e.g. using SSL.

Viewers may wish to monitor multiple audio channels simultaneously. This is typically difficult to do because people are not very good at discriminating between multiple sources of audio in real time. However, the invention provides various options, such as mixing into single audio track; sending different audio tracks to different speakers in a multi-channel audio; displaying text information on the screen for audio that includes text information, e.g. closed caption; and combinations of the above approaches.

DETAILED DESCRIPTION OF THE INVENTION

Figure 1:
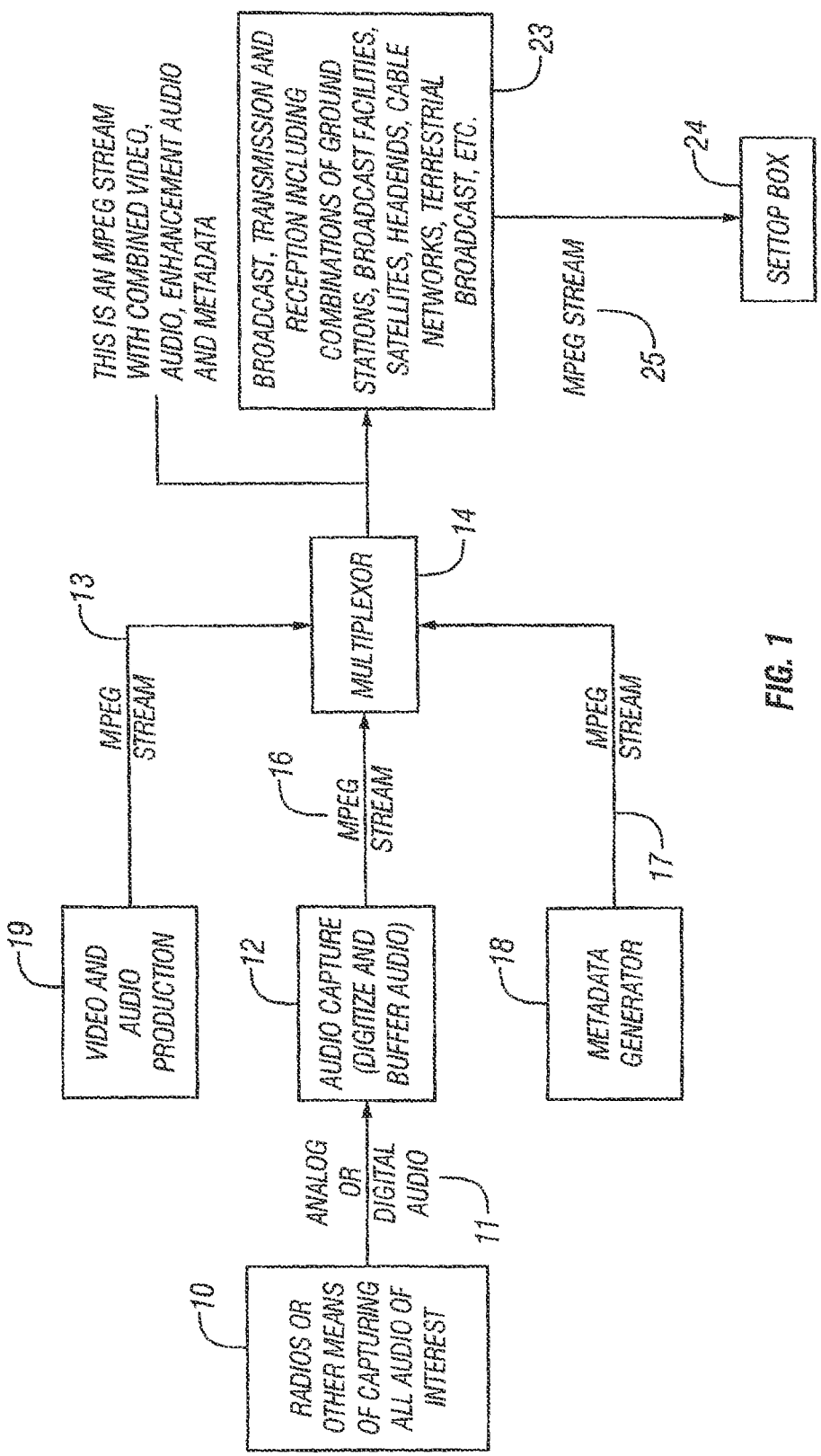
FIG. 1 is a block schematic diagram of a multi-channel audio enhancement for television according to the invention.

The invention provides a comprehensive mechanism for broadcasting and accessing multiple audio sources in connection with the viewing of a television or other program.

For purposes of the discussion herein, the following terms have the meaning associated therewith:

DTS—A set of audio encoding techniques (licensed through DTS Technology, Inc.) not to be confused with MPEG Decoding Time Stamp.

MPEG—Motion Picture Experts Group, a set of standards for audio and video coding. Many of these are international standards.

System Information—when used in context, refers to information about TV programs including information.

In the preferred embodiment, the first step in providing audio is collecting the audio. This is done through the use of standard audio capture. Collected audio is delivered from the location where it is captured, for example, a racetrack, to the point where it will be delivered to a viewer, for example, a headend, a satellite ground station or a terrestrial broadcast studio. Once the audio is at this point, the audio must be distributed. This is preferably done either in-band via broadcast or out-of-band through some other transport channel.

The audio is preferably tagged with metadata, such that information describing the audio accompanies each audio channel. This allows, for example, a description of the audio to be provided to the viewer as part of a selection mechanism (see below), and/or provides control information that is used by the system, for example to configure the system for a particular type of audio processing, e.g. DTS; display accompanying graphic information; such as an ad; or engage a viewer authentication/billing mechanism, for example to provide upstream information concerning the viewer's selections. The tagging may occur in many ways. In a preferred embodiment, information is added to the System Information (SI) data that is part of an MPEG program. In another embodiment, the data can be encoded with the audio itself such that the tag data is delivered in an MPEG elementary stream. In another embodiment data may be sent independently of the audio and video streams, possibly prior to the program being broadcast. Those skilled in the art will appreciate that information may be added to the audio in other ways in connection with the invention.

In-band audio is preferably provided via an MPEG stream associated with the current television program. However, delivery of the audio via other broadcast mechanisms has the same effect. Within a cable system, audio is included in the same channel.

Out-of-band (OOB) audio can be broadcast as well, although it is preferable to select which channel is distributed upstream. That is, only the desired audio channel(s) are sent over the OOB channel, e.g. after viewer selection from a plurality of choices.

With either system, the set top box is used by the viewer to select the appropriate audio channel(s) and to route the television audio to a television or to a separate amplifier and speakers for reproduction.

The presently preferred embodiment of the invention provides two mechanisms for selecting audio, i.e. manual selection and assisted selection.

With manual selection, the viewer is presented with various options and determines which audio channel to use. For example, a graphics overlay can be presented on the television screen which displays the available audio channels to the viewer. When a viewer presses a selection key or moves a selection means, such as a cursor, to a particular item, the desired audio channel is selected.

Assisted selection adds intelligence to the selection process. In this mode, information on the viewer's preference is either gathered directly from the viewer or via a separate mechanism, e.g. such preferences may be inferred from the viewer's viewing preferences or from a viewer profile. This information is used to prioritize or to cull the list of what is offered, thereby only presenting the viewer with choices that are of interest to the viewer. For example, if the viewer is the fan of a particular racer, that racer could always be offered first. Note that previous selections made by the viewer could be used as part of the information used to customize the list for the viewer.

The process of selecting audio can also include the application of parental controls. For example, audio can be tagged with ratings information, and parents can be provided the means, as is done with traditional parental controls, to limit listening to approved selections.

Additional audio programs can include closed captions. These captions can be displayed on the television either with the audio or in lieu of it. Note that this improves the monitoring of multiple audio programs. For example, a viewer may listen to one audio channel while he monitors a closed caption version of another audio channel.

Additional audio selections may be offered as a premium that can be billed through a variety of models, e.g. unlimited free, per use, and total time. The billing system for such premium selections is preferably incorporated in a billing method that is similar to that of video-on-demand (VOD). The basic elements of such billing system include ordering, provisioning, i.e. turning on the audio, and billing. Note that for audio to be billed, it should include conditional access. This can take advantage of existing conditional access systems, or it can be handled via web rights management methods, e.g. using SSL.

Viewers may wish to monitor multiple audio channels simultaneously. This is typically difficult to do because people are not very good at discriminating between multiple sources of audio in real time. However, the invention provides various options, such as mixing into single audio track; sending different audio tracks to different speakers in a multi-channel audio; displaying text information on the screen for audio that includes text information, e.g. closed caption; and combinations of the above approaches.

Discussion of a Presently Preferred Embodiment of the Invention

FIG. 1 is a block schematic diagram of a multi-channel audio enhancement for television according to the invention. In this embodiment, a plurality of radios or other capture mechanisms 10, e.g. microphones, are used to capture the audio of interest. A resulting analog and/or digital signal or signals 11 is provided to an audio capture module 12, which digitizes (if necessary) and buffers the audio. The audio is then processed to provided and MPEG stream 16. MPEG processing is well known in the art and is not discussed at greater length herein. Those skilled in the art will appreciate that other processing schemes may be used in connection with the invention. Further, it will be appreciated that analog schemes, such a frequency division multiplexing (FDM) may be used in connection with, or instead of, digital schemes.

The MPEG stream is presented to a multiplexor 14, which also receives video and audio production information via an MPEG stream 13 from a video and audio production module 19; and that receives metadata as an MPEG stream 17 from a metadata generator 18. Those skilled in the art will appreciate that such processing and multiplexing may employ mechanisms other the MPEG and may comprise data in the analog domain, as well as or alternatively to, the digital domain.

The multiplexor produces a composite MPEG stream 15 that comprises the video program material, metadata, and the multiple audio channels. Other embodiments of the invention may provide the metadata and or audio separately from the video program material.

A standard transport mechanism 23, such as a cable television or satellite television system, is used for the broadcast, transmission, and reception of the MPEG stream 15. This transport mechanism can comprise a combination of ground stations, broadcast facilities, satellites, head ends, cable networks, and terrestrial broadcast facilities, as are well known in the art. A resulting broadcast MPEG stream 25 is provided to a viewer location for decoding, for example using a set top box 24.

Figure 2:
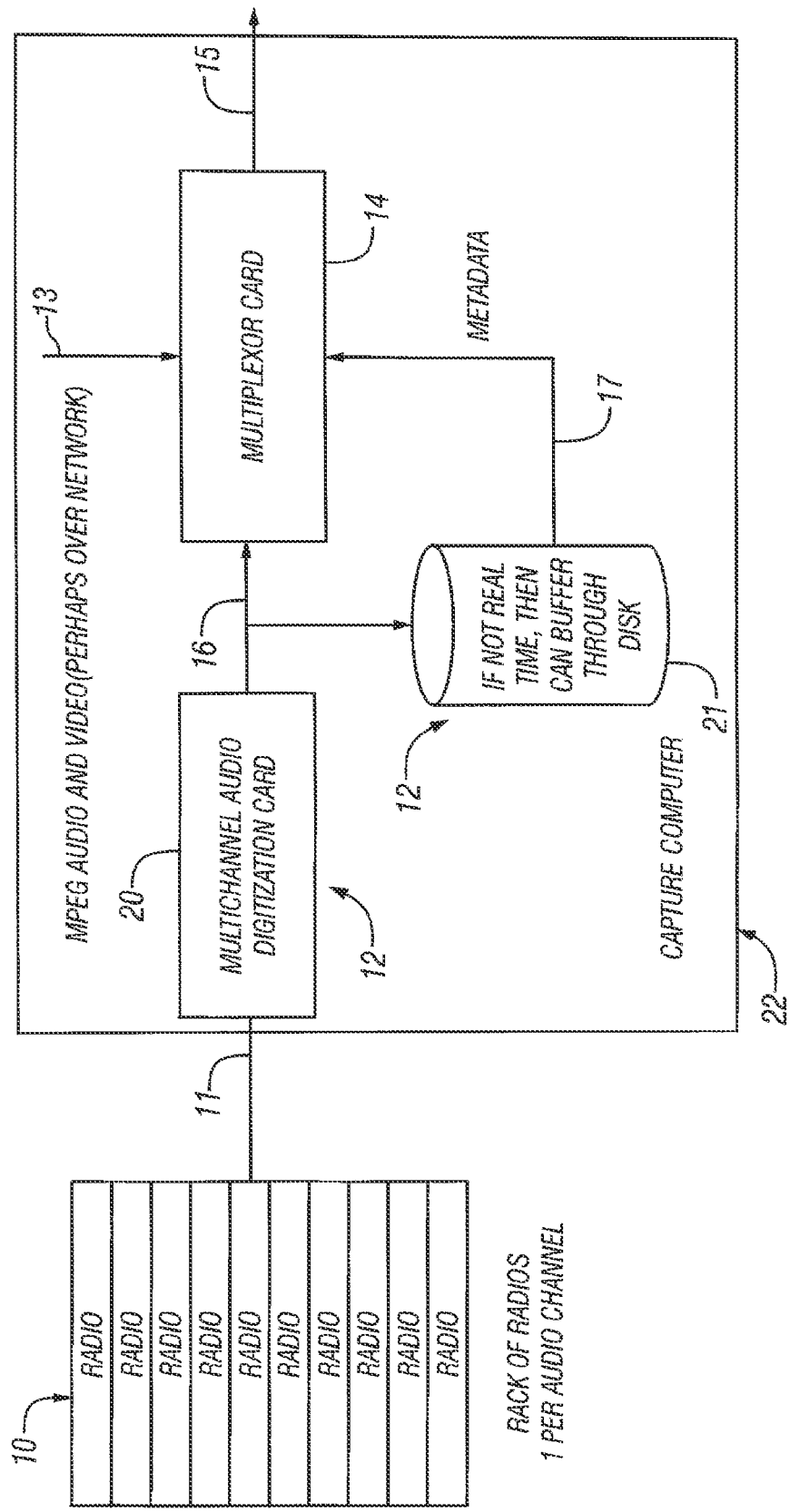
FIG. 2 is a block schematic diagram showing audio capture for a NASCAR race according to the invention.

FIG. 2 is a block schematic diagram showing audio capture for a NASCAR race according to the invention. In this example of the invention, a rack of radios 10 is provided in which each radio corresponds to a single channel of audio. The use of the term radio here refers to the fact that the system would monitor the personal communications channels of each driver with his pit crew. In this sense, the term radio is used generically to refer to any source of audio, and is not limited only to radio frequency broadcast information.

The plurality of radio signals 11 is routed from the rack of radios to a multi-channel digitization card 20 within a capture computer 22. The audio stream 16 is then provided to a multiplexor card 14, which also receives an MPEG audio and video stream 13, e.g. over a network. In this embodiment, the audio stream 16 is also provided to a disk or other storage mechanism 21 for buffering if the audio stream is not provided in real time and metadata 17 is generated and provided to the multiplexor card. An MPEG stream 15 is output that comprises combined video, audio, enhancement audio, and metadata. In one embodiment of the invention, it is preferred to add timing to the audio data to ensure that timing is maintained all the way through playback.

Figure 3:
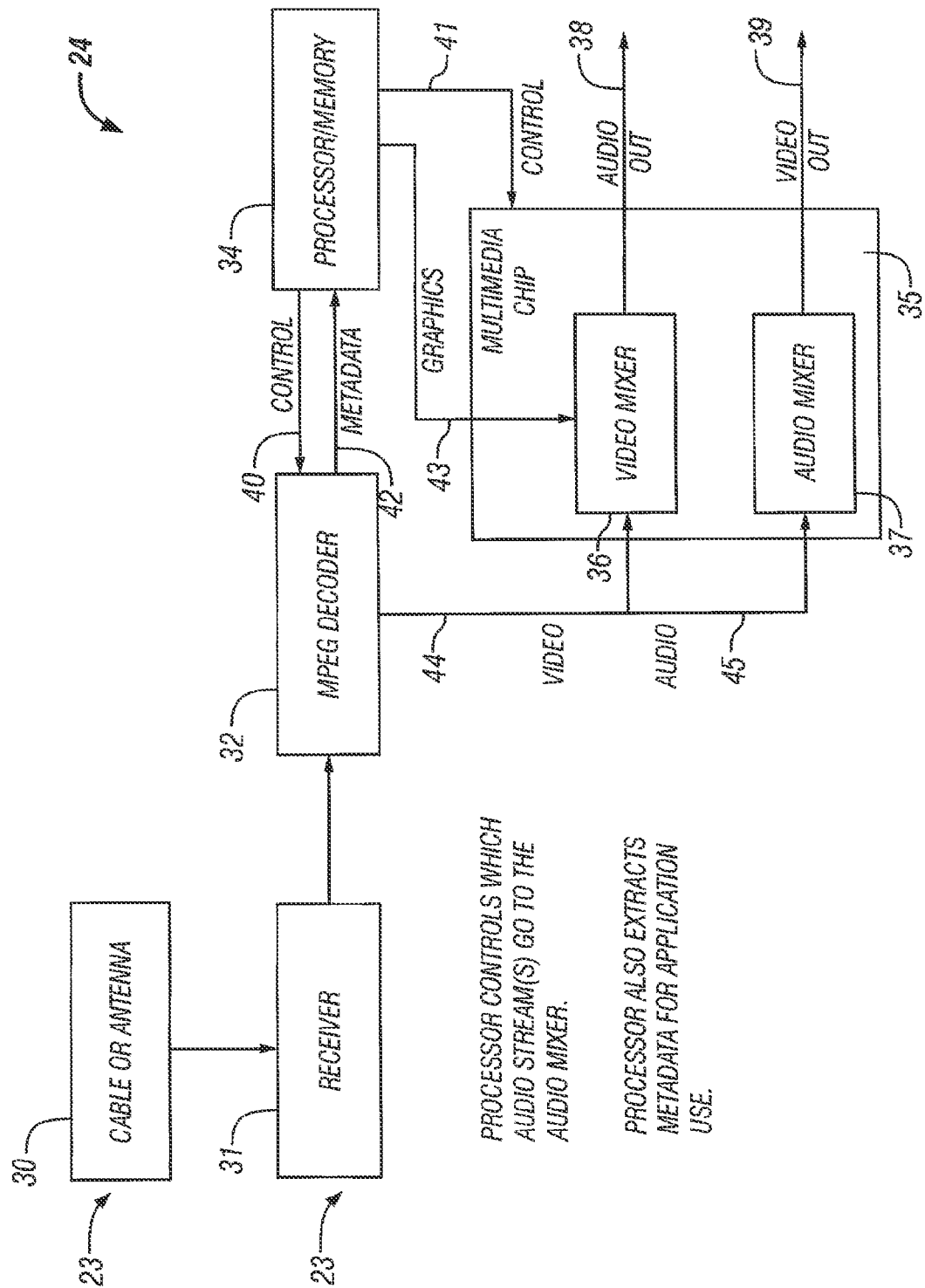
FIG. 3 is a block schematic diagram of a set top box according to the invention.

FIG. 3 is a block schematic diagram of a set top box according to the invention. The set top box 24 receives the MPEG stream via a transmission method 23 which, in this example, comprises a cable or antenna 30 and receiver 31 at the viewer's home.

The MPEG stream thus received is provided to an MPEG decoder 32 which extracts the metadata 42, video 44, and enhanced audio 45 therefrom under control of a processor/memory 34. The video stream 44 is provided to a video mixer 36 in a multimedia chip 35. The processor controls which audio streams extracted from the MPEG stream are provided to an audio mixer 37 in the multimedia chip via a control mechanism 41. The processor also extracts metadata 42 from the MPEG stream via a control mechanism 40 for application use, for example to derive graphics 43 therefrom that describe the enhancement audio. The system then outputs both audio 38 and video 39 for reproduction on the viewer's television and/or other viewer equipment (not shown). If timing information is included, then the audio is synchronized with the video. Because set top boxes are well known in the art, an additional description thereof is not provided.

Figure 4:
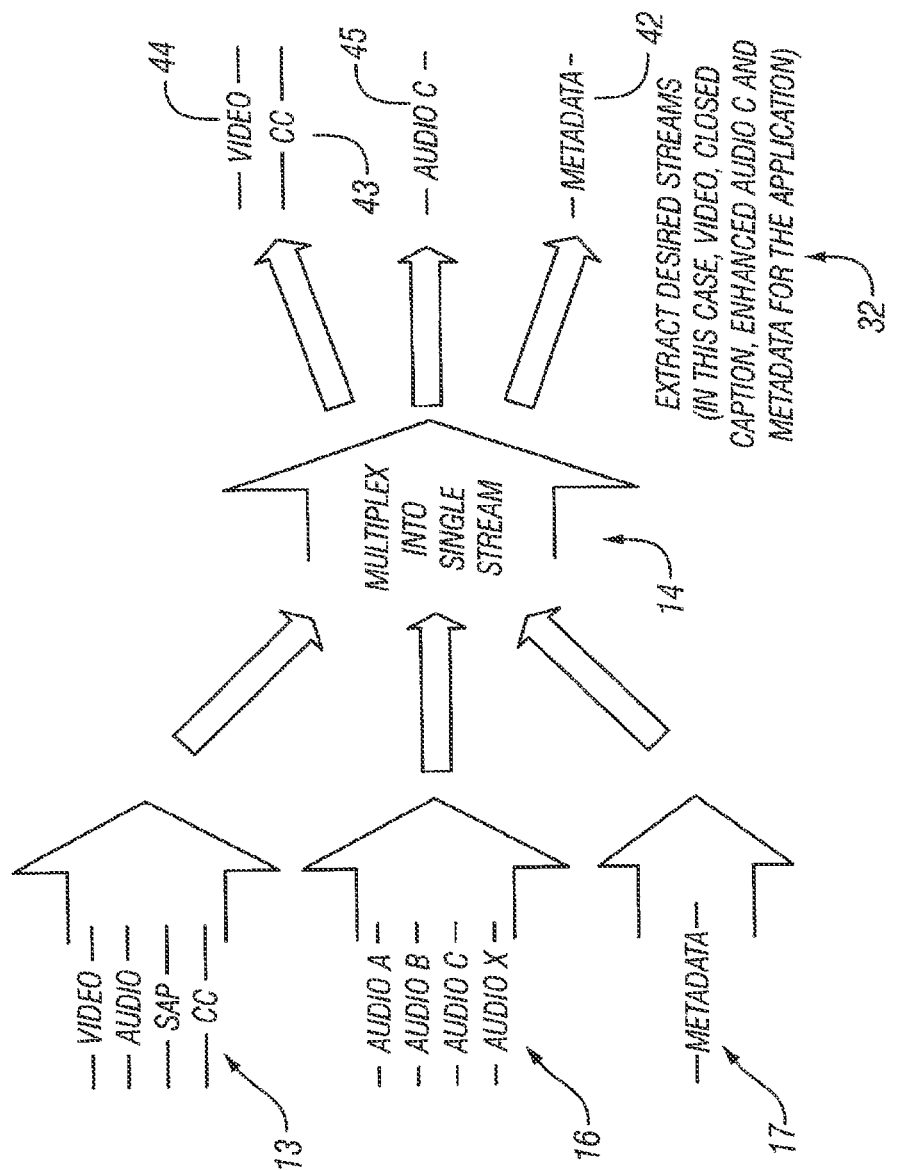
FIG. 4 is a flow diagram showing a multiplexing and demultiplexing process according to the invention.

FIG. 4 is a flow diagram showing a multiplexing and demultiplexing process according to the invention. The preferred embodiment of the invention multiplexes a standard audio/video signal/stream 13 with a plurality of enhancement audio stream 16 and metadata 17 using a multiplexing mechanism 14. The combined stream is broadcast and a decoding/extraction process 32 separates the various streams into video 44, closed caption information 43 (if applicable), audio 45 (which is selected from among standard and enhancement audio), and metadata 42.

Figure 5:
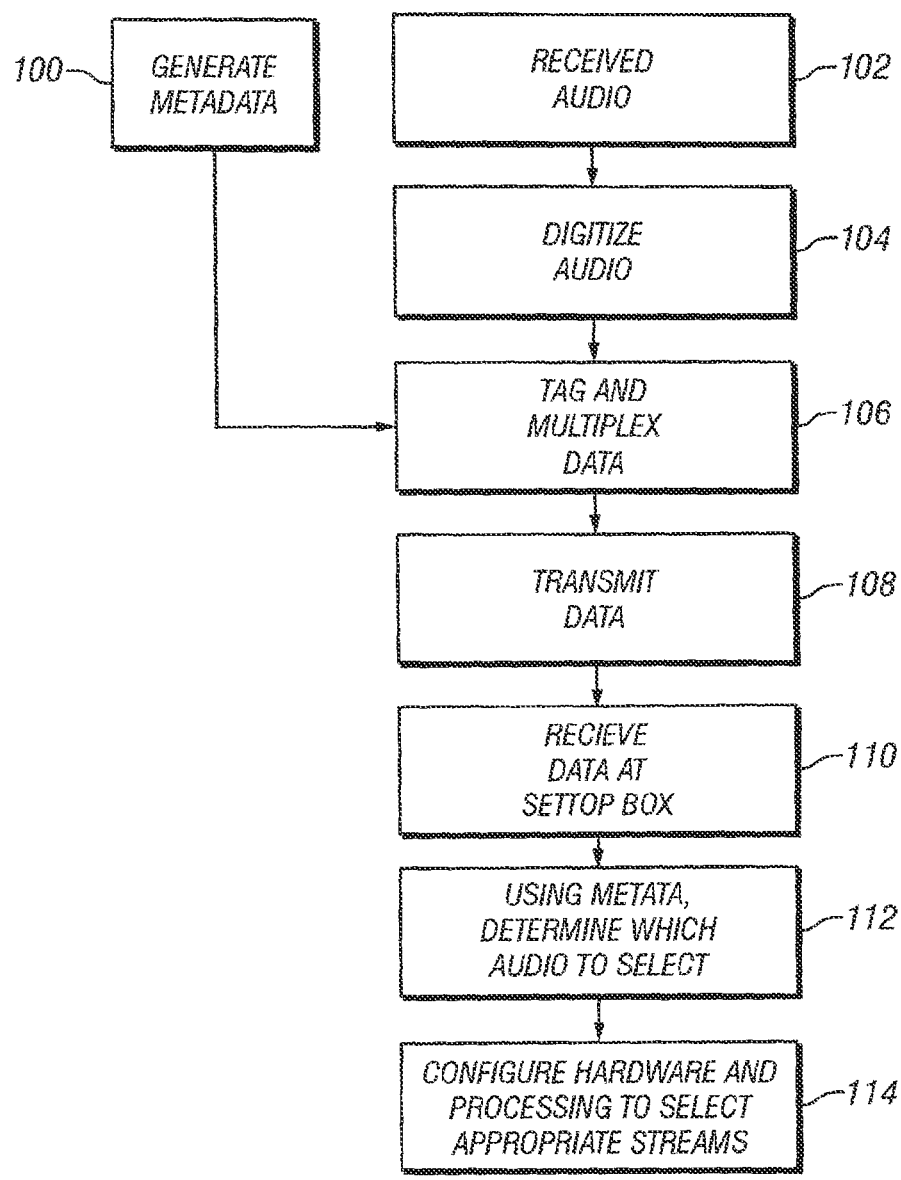
FIG. 5 is a flow diagram showing multi-channel audio enhancement for television according to the invention.

FIG. 5 is a flow diagram showing multi-channel audio enhancement for television according to the invention. In this process, multiple channels of audio are received (102) and digitized (104). Metadata is also generated (100), and the metadata and digitized audio are tagged and multiplexed (106). The data are then transmitted (108), received at the viewer's set top box (110), and the metadata is extracted and displayed to the viewer (112) for use in determining which audio channel to select. Responsive thereto, the set top box, typically under processor control, configures the system to select and process an appropriate audio stream (114).

As discussed above, it is preferred to conserve bandwidth. When the user has a dedicated channel such as an OOB channel in a broadcast network, a dedicated channel on a shared network such as done with video on demand (VOD), where a dedicated link, such as DSL, is used for audio and video delivery the following technique can be used to conserver bandwidth. Note that this would not apply to a strictly broadcast facility because all users would hear the same audio and they could not effectively select their own. The several channels of enhancement audio may be identified via the metadata, but they are not all themselves transmitted to the set top box at the same time. Rather, viewer selection of one or more specific channels results in an interactive, upstream transmission to a head end or central location, thereby instructing the system which particular audio channels are to be transmitted. This up stream communication may also contain authorization and/or billing information. In addition to conserving bandwidth, this approach also minimizes the need for a dedicated set top box. Rather, legacy systems may be readily adapted to use the invention, for example, by stripping out standard audio, closed caption and SAP information, and inserting user selected information in place thereof.

Figure 6:
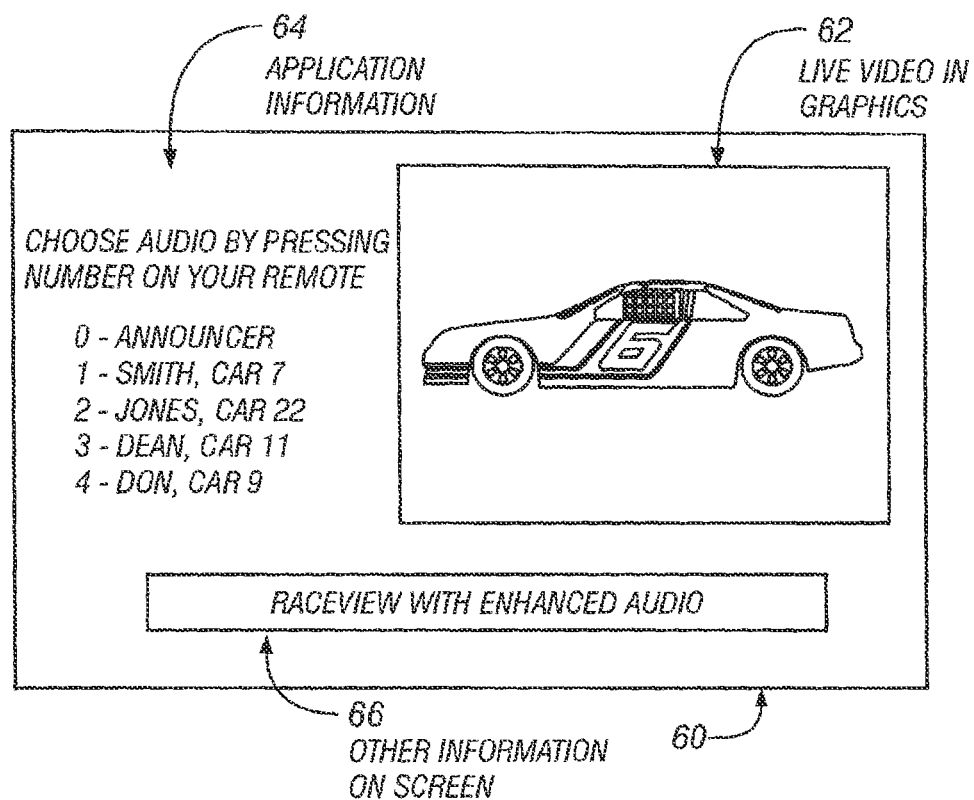
FIG. 6 is a diagram of a sample viewer interface according to the invention.

FIG. 6 is a diagram of a sample viewer interface according to the invention. On a typical display 60, the viewer is presented with video and/or graphics 62 during the enhancement audio selection process. Various other information 66, such as advertising, billing information, or program statistics, may also be provided. The viewer controls the selection process through a control mechanism 64, such as a cursor mechanism or a simple numeric selection via the viewer's remote control. Thereafter, the viewer's selection may be confirmed and the viewer begins to receive the selected enhancement audio. While a simple viewer interface is shown in FIG. 6, it will be appreciated by those skilled in the art that additional functions may be provided to the viewer, such as for example, fader controls when multiple channels of audio are selected for simultaneous reception, authorization dialogs, parental control dialogs, and closed caption controls.

Data Structures

Tables 1-4 below show a simple metadata description for multi-channel audio enhancement, in which Table 1 shows an audio enhancement structure; Table 2 shows a data title structure; Table 3 shows an enhancement channel structure; and Table 4 shows a data value structure.

TABLE 1

Audio Enhancement Structure

| Field | Data Type | Description |
| --- | --- | --- |
| Short title length | Binary | Length of following field |
| Short title | Text | Brief description of audio enhancement |
| Title length | Binary | Length of following field |
| Title | Text | Longer description of audio enhancement |
| Number of data descriptors | Binary | Number of data description fields for each channel |
| Number of Enhancement Channels | Binary | Number of additional audio channels |
| Data Titles | Data title structure | One for each of "number data descriptors" |
| Enhancement Channel Structures | Enhancement channel structure | One for each of "Number of Enhancement Channels" |

TABLE 2

Data title structure

| Field | Data Type | Description |
| --- | --- | --- |
| Descriptor title length | Binary | Length of following field |
| Descriptor title | Text | Text descriptor. Length = Descriptor value length |

TABLE 3

Enhancement channel structure

| Field | Data Type | Description |
| --- | --- | --- |
| Data Values | Data Value Structure | One for each "Number of data descriptors" in Audio Enhancement Structure |

TABLE 4

Data Value Structure

| Field | Data Type | Description |
| --- | --- | --- |
| Descriptor value length | Binary | Length of following field |
| Descriptor value | Text | Text descriptor. |

EXAMPLE

The following provides a pseudo-code example of an audio enhancement data structure according to the invention. Note that // and everything after // is a comment.

```
//Audio Enhancement Data Structure
12, "NASCAR Audio", //short title length and title
33, "NASCAR Audio for Jan. 17, 2002" II title length and title
3//number of data descriptors
24//number of enhancement channels
//Data Title Structure
6, "Driver"
5, "Freq."
5, "Car #"
//Enhancement channel structure consists of Data value structures
//first Data value structure
5, "Smith"
6, "192.13"
1, "7"
//next Data value structure
5, "Jones"
6, "193.23"
2, "22"
//in this example, 22 more entries would follow
. . .
```

The data above are added either to the data itself, thereby creating a new audio data type; or to the system information (SI) that comes with MPEG data, e.g. DVB-SI or PSIP. In the former case, the audio encoding, e.g. PCM 44.1 kHz 16-bit or AC-3, is also added. In the latter case, the SI information is enhanced to add this data type, but there are already provisions within most established SI data structures for describing the audio format.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method comprising:
receiving a multiplexed signal comprising a video signal, a plurality of audio signals, and metadata comprising rating information, wherein each of the plurality of audio signals is associated with a corresponding rating of the rating information;
receiving a selection of an audio signal of the plurality of audio signals; and
causing output of the video signal and the selected audio signal in response to a determination that the selected audio signal corresponds to an approved selection, based on a rating associated with the selected audio signal.

2. The method of claim 1, further comprising processing the metadata to obtain a description of audio content of each of the plurality of audio signals.

3. The method of claim 2, wherein the description of audio content indicates that a first audio signal of the plurality of audio signals comprises audio commentary from a first person and that a second audio signal of the plurality of audio signals comprises audio commentary from a second person.

4. The method of claim 1, wherein the plurality of audio signals are encoded as MPEG signals.

5. The method of claim 1, further comprising collecting preference information based on input information or on viewing preferences to assist a user in selecting the audio signal.

6. The method of claim 5, wherein the preference information provides information for prioritizing an order of titles of two or more of the plurality of audio signals based on the preference information for simultaneous presentation of the titles in the order.

7. The method of claim 5, further comprising:
prioritizing an audio signal list comprising the plurality of audio signals based on the preference information; and
causing presentation of the audio signal list.

8. The method of claim 5, further comprising:
culling an audio signal list comprising the plurality of audio signals based on the preference information; and
causing presentation of the audio signal list.

9. A method comprising:
receiving, by a receiver, a content asset that comprises a video signal, that comprises a plurality of audio signals, and that comprises metadata comprising rating information, wherein each of the plurality of audio signals is associated with corresponding metadata of the metadata comprising rating information;
determining, based on the metadata, a subset of the plurality of audio signals;
receiving a selection of an audio signal of the subset of the plurality of audio signals; and
outputting, by a processor, the video signal and the selected audio signal.

10. The method of claim 9, further comprising:
decoding, by a decoder, the content asset from a multiplexed signal.

11. The method of claim 9, wherein the metadata further comprises at least one of a description of the audio signal, information identifying the audio signal, and control information for use in processing the audio signal.

12. The method of claim 11, further comprising: processing the metadata to obtain a description of audio content of each of the plurality of audio signals.

13. The method of claim 12, wherein the description provides information for prioritizing an order of titles of two or more of the audio signals based on viewer preferences for simultaneous presentation of the titles in the order.

14. The method of claim 9, wherein the audio signals are encoded as MPEG signals.

15. The method of claim 9, further comprising: collecting preference information based on at least one of input information and viewing preferences, wherein the determining is further based on the preference information.

16. The method of claim 15, further comprising:
culling an audio signal list comprising the plurality of audio signals based on the preference information; and
causing presentation of the audio signal list.

17. The method of claim 9, further comprising:
causing presentation of the subset of the plurality of audio signals.

18. A method comprising:
receiving a video signal, a plurality of audio signals, and metadata, wherein each of the plurality of audio signals is associated with corresponding metadata;
determining, based on a user preference and the metadata, a subset of the plurality of audio signals;
causing output of a selectable audio feature comprising the subset of the plurality of audio signals;
receiving a selection of an audio signal of the subset of the plurality of audio signals; and
causing output of the video signal and the selected audio signal.

19. The method of claim 18, further comprising determining the user preference based on user input received from a user input device.

20. The method of claim 18, wherein the metadata comprises rating information and wherein the determining the subset of the plurality of audio signals comprises determining the subset based on the ratings information.

* * * * *

UNITED STATES PATENT AND TRADEMARK OFFICE
CERTIFICATE OF CORRECTION

PATENT NO. : 9,560,304 B2
APPLICATION NO. : 13/242298
DATED : January 31, 2017
INVENTOR(S) : Seidel et al.

Page 1 of 1

It is certified that error appears in the above-identified patent and that said Letters Patent is hereby corrected as shown below:

In the Drawings

Sheet 5 of 6, Reference Numeral 110, FIG. 5:
Please delete "RECIEVE" and insert --RECEIVE--

Signed and Sealed this
Twentieth Day of February, 2018

Andrei Iancu
*Director of the United States Patent and Trademark Office*